United States Patent
Fay et al.

(10) Patent No.: US 8,990,693 B2
(45) Date of Patent: Mar. 24, 2015

(54) SYSTEM AND METHOD FOR DISTRIBUTED MEDIA PERSONALIZATION

(75) Inventors: Todor Fay, San Diego, CA (US); Melissa J. Grey, San Diego, CA (US); Igor Shakirov, Tomsk (RU); Viktor Sherbakov, Tomsk (RU); Eric Poggel, Scottsburg, IN (US)

(73) Assignee: Newblue, Inc., La Jolla, CA (US)

( * ) Notice: Subject to any disclaimer, the term of this patent is extended or adjusted under 35 U.S.C. 154(b) by 308 days.

(21) Appl. No.: 13/166,785

(22) Filed: Jun. 22, 2011

(65) Prior Publication Data

US 2011/0311199 A1    Dec. 22, 2011

Related U.S. Application Data

(60) Provisional application No. 61/357,442, filed on Jun. 22, 2010, provisional application No. 61/357,443, filed on Jun. 22, 2010, provisional application No. 61/357,447, filed on Jun. 22, 2010.

(51) Int. Cl.
| G06F 3/048 | (2013.01) |
| H04N 5/76 | (2006.01) |
| G11B 27/034 | (2006.01) |
| G11B 27/34 | (2006.01) |
| G06F 3/0484 | (2013.01) |

(52) U.S. Cl.
CPC ............. *H04N 5/76* (2013.01); *G06F 3/048* (2013.01); *G11B 27/034* (2013.01); *G11B 27/34* (2013.01); *G06F 3/0484* (2013.01)
USPC .......................................... 715/719; 715/723

(58) Field of Classification Search
CPC ............... G06F 3/048; G06F 3/0484
USPC ............................................. 715/723, 719
See application file for complete search history.

(56) References Cited

U.S. PATENT DOCUMENTS

| 2003/0131076 | A1 | 7/2003 | Nelson et al. |
| 2003/0236905 | A1* | 12/2003 | Choi et al. ............... 709/231 |
| 2004/0150663 | A1* | 8/2004 | Kim ........................ 345/723 |
| 2005/0232588 | A1 | 10/2005 | Hosoda et al. |
| 2007/0074104 | A1 | 3/2007 | Kotzin |
| 2007/0168543 | A1 | 7/2007 | Krikorian et al. |
| 2007/0234214 | A1* | 10/2007 | Lovejoy et al. ............ 715/719 |
| 2008/0022205 | A1 | 1/2008 | Shinkai et al. |

(Continued)

FOREIGN PATENT DOCUMENTS

KR   1020100020091 A   2/2010

OTHER PUBLICATIONS

International Search Report and Written Opinion issued in PCT/US2011/041535 on Dec. 16, 2011, 13 pages.

*Primary Examiner* — Patrick Riegler
*Assistant Examiner* — Phuong Nguyen
(74) *Attorney, Agent, or Firm* — Procopio, Cory, Hargreaves & Savitch LLP; Noel C. Gillespie

(57) ABSTRACT

A method of generating edited video, the method comprises receiving, at a server, an unedited video from a user device; receiving, at the server, user input indicating one or more effects to apply to the unedited video from the user device; generating, at the server, a plurality of intermediate representations of the unedited video; and generating, at the server, an edited video based on, at least in part on the unedited video, the user input, and one of the plurality of intermediate representations.

26 Claims, 9 Drawing Sheets

(56) References Cited

U.S. PATENT DOCUMENTS

| | | |
|---|---|---|
| 2008/0046925 A1 | 2/2008 | Lee et al. |
| 2009/0092374 A1* | 4/2009 | Kulas .............................. 386/95 |
| 2009/0143052 A1 | 6/2009 | Bates et al. |
| 2009/0150406 A1 | 6/2009 | Giblin |
| 2010/0080528 A1* | 4/2010 | Yen et al. ........................ 386/52 |
| 2010/0242066 A1 | 9/2010 | Tseng |
| 2010/0325547 A1 | 12/2010 | Keng et al. |
| 2011/0035667 A1* | 2/2011 | Dittmer-Roche ............. 715/716 |
| 2011/0302123 A1* | 12/2011 | Nista et al. ..................... 706/52 |

\* cited by examiner

SYSTEM AND METHOD FOR DISTRIBUTED MEDIA PERSONALIZATION

RELATED APPLICATIONS INFORMATION

The application claims the benefit under §119(e) of U.S. Provisional Application Ser. No. 61/357,442 filed Jun. 22, 2010 and entitled "System and Method for Media Personalization," and also claims the benefit under §119(e) of U.S. Provisional Application Ser. No. 61/357,443 filed Jun. 22, 2010 and entitled "System and Method for Distributed Media Personalization," and also claims the benefit under §119(e) of U.S. Provisional Application Ser. No. 61/357,447 filed Jun. 22, 2010 and entitled "System and Method for Remote Media Processing Selection and Preview," all of which are incorporated herein by reference in their entirety as if set forth in full.

FIELD OF THE INVENTION

Embodiments described herein generally relate to the fields of media processing and network communication systems and more specifically to systems and methods for personalizing media using a communication network.

BACKGROUND

With the explosion of social networking, cloud storage and computing, faster network speeds, and smart phones and tablets with video capability, people are capturing and sharing video in greater and greater amounts. Thus, it is not uncommon for mom or dad to capture a video of their child being dropped off at school, participating in an activity, or just running around the house with their smart phone and then immediately email the video to friends and family or post it on a social networking page. Often, however, the quality of these videos is not very good. The image is choppy and bounces around, there is little or no audio, etc. In addition, the video is not very professional looking, i.e., there is no title, introduction, sound track, etc.: Things that can be done to make even impromptu videos such as those described above compelling to even an uninterested observer if done well. So while the video is very interesting and meaningful for mom and dad, it may not be as interesting to everyone else.

As a result, there are application available that will allow a user to edit their video and generate a much more refined productions in which some of the choppiness is smoothed out, filtering is applied to enhance the video quality, sound effects are applied and synchronized with the images, a theme can be applied, etc. But often these tools require a larger investment of time than the average user is willing to commit. Unfortunately, the conventional resources required to perform such editing do not allow for quick, easy editing that can produce a more interesting and professional video. Further, conventional devices used to capture video or to share video over the internet are often resource constrained. For example, the device may be limited by processing capability, power, or other resources. As a result, the resulting video typically will lack editing or other features that would greatly improve the quality of the shared video.

SUMMARY

Systems and methods for turning video clips captured with a user device into polished final products and for automatically sharing them are disclosed herein.

According to an aspect, a method of generating edited video, the method comprises receiving, at a server, an unedited video from a user device; receiving, at the server, user input indicating one or more effects to apply to the unedited video from the user device; generating, at the server, a plurality of intermediate representations of the unedited video; and generating, at the server, an edited video based on, at least in part on the unedited video, the user input, and one of the plurality of intermediate representations.

According to another aspect, a system generating edited video, the system comprises a network interface configured to receive an unedited video and user input indicating one or more effects to apply to the unedited video from a user device; and a transformer module configured to generate a plurality of intermediate representations of the unedited video and the generate an edited video based on, at least in part, the unedited video, the user input, and one of the plurality of intermediate representations.

BRIEF DESCRIPTION OF THE DRAWINGS

The details of the embodiments, both as to its structure and operation, may be gleaned in part by study of the accompanying drawings, in which like reference numerals refer to like parts, and in which.

DETAILED DESCRIPTION

Systems and methods media personalization and sharing are presented. In one embodiment, the present method and tool or system allows a user to take a video clip that was just shot, e.g., with a mobile device and turn it into something personalized and polished and route it to desired destinations quickly and easily. For example, in some implementations, the tool or system allows or enables a user to apply a Video Tag, also referred to as a Personalization, to media from any device. Further, the system allows a user to modify and configure a Video Tag from any device. The user can also preview the modified video in real-time. As a result, a user can quickly and easily generate polished video, preview it, and share with friends or post it to a social networking page.

As used herein, a Video Tag, Video Tag template, Production, or Production template includes a set of instructions to personalize media. In one embodiment, the Video Tag defines a set of effects to apply to a video along with embellishments such as music and title style. The Video Tag defines the process for producing a video clip in a particular style and also includes options for user modification. In general, a Video Tag represents a configuration that can include a sequence of images, video clips, titling, sounds effects, transitions, mixing, etc., to wrap that video clip into a complete polished video.

As noted above, in some circumstances, the devices used to capture video or to share video over the internet are resource constrained. For example, a mobile phone or other device may be limited by processing power, bandwidth, power, or other resources when editing and sharing video. In one embodiment, a client application is provided to the user of a resource constrained device that facilitates video personalization without excessive consumption of resources. A corresponding application is provided on, for example, a server, to perform portions of the video customization and sharing. As described below, this advantageously facilitates sophisticated media personalization despite resource constrained user devices.

In other circumstances, a user may use multiple devices to capture video. For example, a user may have a cell phone capable of capturing video as well as another mobile device with similar capture capabilities. A user may have a set of preferences for personalizing video regardless of capture device. In one embodiment, systems and methods are provided for making a user's personalization and sharing settings available across multiple devices. In other circumstances, systems and methods are provided to taking simple video and converting it into a fully polished and personalized production. Various combinations of the embodiments described herein are possible.

Figure 1A:
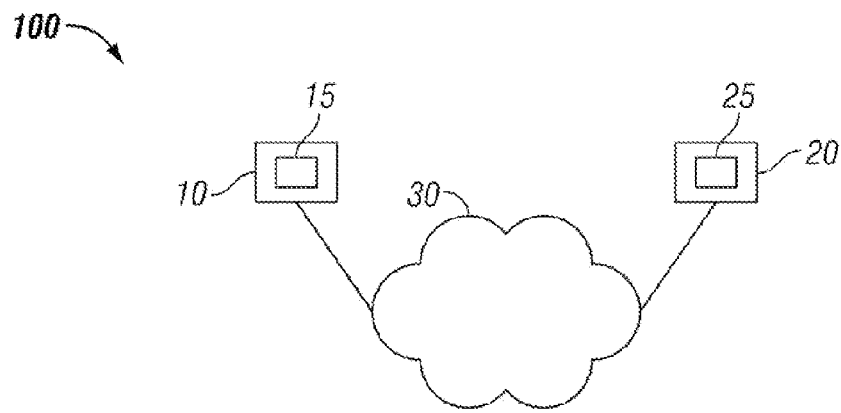
FIG. 1A is a block diagram of networked computer systems for personalizing and sharing media according to an embodiment.

Turning now to FIG. 1A, a block diagram of networked computer systems 100 for personalizing and sharing media is shown. The networked computer systems 100 include a user device 10, a network 30, and a server 20. The user device 10 is communicatively coupled to the network 30. The server 20 is also communicatively coupled to the network 30. The user device and server communicate via the network 30.

In one embodiment, the user device 10 is a machine with the ability to communicate over the network 30. For example, in one embodiment, the device 10 is a personal computer with a network connection such as an Internet connection or a wireless device, such as a mobile telephone or a personal digital assistant, with access to a wireless network. The user device 10 comprises an application module 15. As described in greater detail below, the application module 15 operates in conjunction with the server 20 to accomplish the media personalization and sharing described herein.

It will be understood that conventional devices, such as those described above with respect to device 10 often include great hardware for video compression so they can squeeze a large amount of video data through the network 30. Often such devices are therefore optimized for great transcoding of the video, which often makes the process of compressing video, uploading it to a server 20 where it can be processed, recompressed, and downloaded to device 10 faster than processing the video on the device, but also allows more sophisticated processing as described below.

For example, in one embodiment, the application module 15 is configured to access media, such as a video stored on the device 15. The application module 15 is configured to upload this media to the server 20 via the network 30. The application module 15 is also configured to receive input from a user of the device 10 in the form of customization options. The application module 15 transmits this input to the server 20. In some embodiments, the application module 15 receives media from the server that are previews of what the personalized media will look like once it is fully processed. The application module 15 displays these previews to the user of the device 10. The user can provide additional input to the application module 15 based on the previews. The application module 15 then sends the additional input to the server 20 via the network 30. In some embodiments, this process of receiving previews, presenting the previews to the user, and sending additional input to the server continues at the application module 15 until the user is satisfied with the personalized media. After receiving an indication of acceptance, the application module 15 is configured to transmit an indication of the acceptance to the server 20. In some embodiments, the application module also solicits input from the user on how the personalized media should be shared. The application module transmits this input on how the personalized media is to be shared or published, e.g., to facebook, youtube, or another internet site. Other examples of the operation of the device 10 and the application module 15 are described in greater detail below.

In one embodiment, the server 20 is a computer system with a network connection such as a server, a personal computer, or other device capable of performing the processes described herein and communicating over a network. The server 20 comprises a transformer module 25. As described in greater detail below, the transformer module 25 operates in conjunction with the application module 15 in order to accomplish the media personalization and sharing described herein.

It will be understood that server 20 is intended to be representative of the resources needed to carry out and implement the systems and methods described. As such, server 20 can comprise multiple servers, routers, processors, databases, storage devices, applications, APIs, programs, user interfaces, etc., as needed or required by a particular implementation. Moreover, it will be understood that many, if not all of these resources can reside in the cloud.

In one embodiment, the transformer module 25 receives media, such a video clip, from the user device 10 as well as an indication of one or more customization options. The transformer module 25 processes the media according to the customization options. In some embodiments, the transformer module 25 also generates previews of the personalized media and transmits the previews to the user device 10. These previews can be provided in real-time or near real-time as described below. The transformer module 25 receives additional feedback from the user device 10 in response to the transmitted previews and further processes the media responsive to the feedback. In some embodiments, the transformer module generates and transmit new previews to the user device 10 based on the feedback. In some embodiments, after one or more of these feedback cycles, the transformer module 25 receives an indication of an acceptance of the media personalization. The transformer module then shares personalized media according to input received from the device 10. Other examples of the operation of the server 20 and the transformer module 25 are described in greater detail below.

In one embodiment, the network 30 comprises a communication network such as the Internet, a local area network, a wide area network, a virtual private network, a telephone network, a cellular network, a direct connection a combination of these networks or another type of communication network.

Advantageously, the systems 100 operate in conjunction to allow resource constrained devices to perform sophisticated, user controlled, media personalization and to share the personalized media.

Figure 1B:
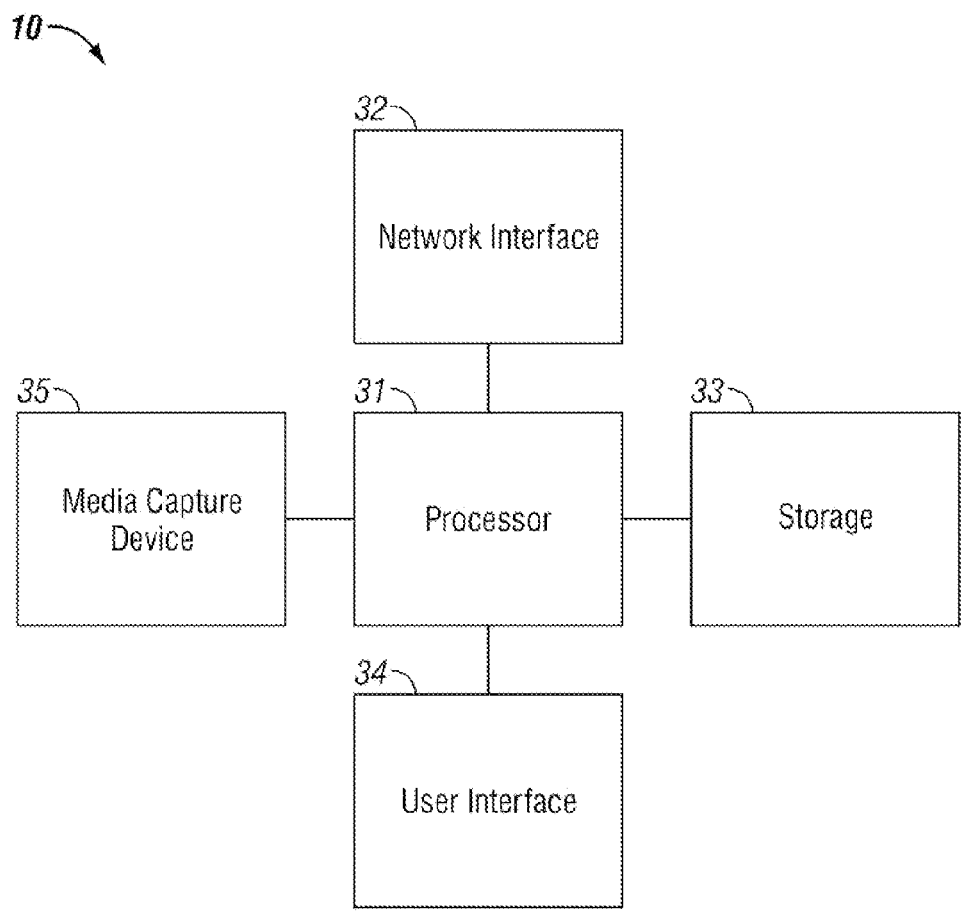
FIG. 1B is a block diagram of a user device according to an embodiment.

FIG. 1B is a block diagram of a user device 10. In one embodiment, the user device 10 is similar to the user device 10 of FIG. 1A. The user device 10 comprises a processor 31, a network interface 32, a storage 33, a user interface 34, and a media capture device 35. The processor is communicatively coupled to the network interface 32, storage 33, user interface 34, and media capture device 35. In one embodiment, the processor 31 is configured to implement the functionality described herein with respect to the application module 15 and the device 10.

The network interface 32 transmits and receives messages via the network 30. For example, the network interface 32 transmits media, such as videos, to the server 20 via the network 30 and receives previews from the server 20 via the network 30. The storage 33 is a tangible, computer readable medium. It stores, for example, media, such as videos and instructions for causing the processor 31 to perform the functionality described with respect to the application module 15 and the device 10.

The user interface 34 comprises an interface for presenting information to a user of the device or for receiving input from a user, or both. For example, the user interface may comprise a touch screen for presenting previews to a user and for accepting input regarding personalization options regarding the media being personalized. Other types of devices that communicate to a user or receive information from a user may also be used. The media capture device 35 comprises a device such as a camera or microphone that captures media. The captured media can be stored in the storage 33 and processed by the processor 33 as described herein. Examples of a user device, in this case a mobile user device, are illustrated in FIGS. 5A-F.

Figure 2:
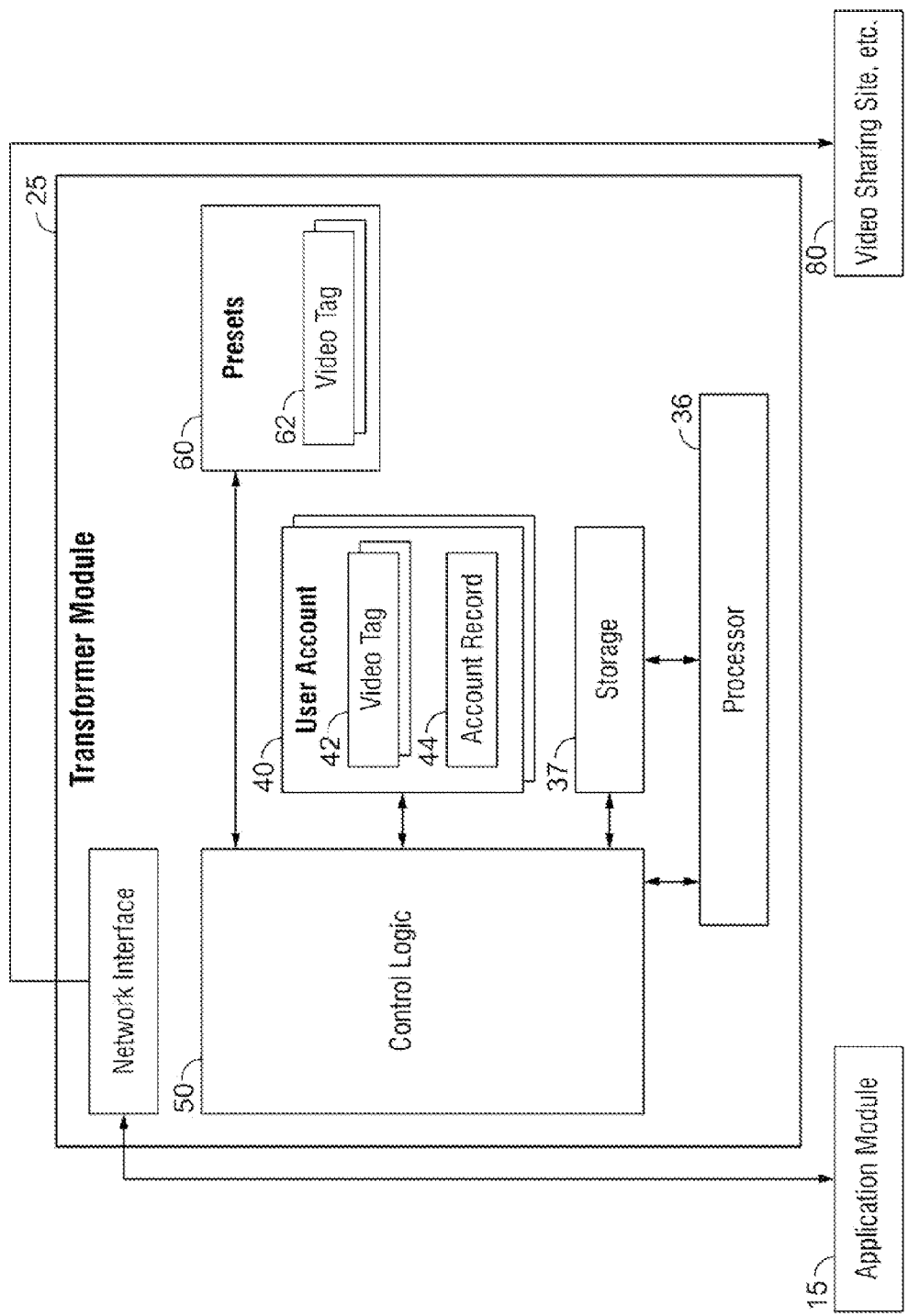
FIG. 2 is a functional block diagram of networked computer systems for personalizing and sharing media according to another embodiment.

FIG. 2 is a functional block diagram of networked computer systems for personalizing and sharing media. In particular, additional details of the transformer module 25 are shown. As described herein, the transformer module 25 applies a Video Tag to media to generate personalized output. As shown in FIG. 2, in one embodiment, the transformer module 25 includes user account storage 40, preset storage 60, control logic 50, processor 36, storage 37, and network interface 38. The control logic 50 is communicatively coupled to the user account storage 40, preset storage 60, storage 37, processor 36, and network interface 38 and controls the functioning of these other elements of the transformer module 25.

In one embodiment, the user account storage 40 stores account records or information 44 for individual users. These account records can be unique for each user. These account records 44 can include one or more Video Tags 42 associated with a user's account. As noted above, a Video Tag or Video Tag template is a set of instructions to personalize media. In one example, the Video Tag defines a set of effects to apply to a video along with embellishments such as music and title style. Video Tags define the process for producing a video clip in a particular style and also include options for user modification. A user account 44 can have one or more Video Tags 42 associated with it in the user account storage 40. The set of effects for a particular Video Tag can have default settings for various settings. Users can modify the default settings for default Video Tags and thereby create modified or customized Video Tags. Advantageously, by providing default settings, users can quickly select and apply a Video Tag. At the same time, by allowing users to customize or modify Video Tags, a high degree of personalization is provided. In general, modified Video Tags are Video Tags that have been changed in any manner from a default state by a user. Preset storage 60 includes a plurality of preset Video Tags 62 having their default values. The account associated Video Tags 42 can include preset Video Tags 62 or modified versions of the preset Video Tags 62 or both.

In addition each user account record 44 can contain additional information. In one embodiment, this additional information can include records that are used for billing. In one particular example, the Account record 44 includes information on the minutes of processing applied to media uploaded by a user associated with the account to facilitate usage based billing. In another embodiment, the account record 44 for a user contains rules for sharing or propagating the personalized media. These rules can include information such as where to place the media, e.g., Youtube, Facebook, etc. In one embodiment, these rules are set based on input received from the user device 10. For example, in one embodiment, the user selects and identifies where the videos are transmitted and posted. The rules can include information for sending media to services. This information can include account id's, passwords, file format descriptions, or other information. In one embodiment, a setup wizard or other program runs on the user device 10 in order to walk a user through the configuration of different settings and collect user input for such rules. In one embodiment, the types of information collected and stored by the user device 10 and transmitted to the transformer module 25 depend in part on the intended destination for the media, e.g., Youtube or other website. In some embodiments, the Account record 44 also contains other information such as nicknames, photos, personalized media, or un-edited media.

The storage 37 is a tangible computer readable medium that stores information for use by the other components of transformer module 25. In one example, the storage 37 stores unprocessed media from user devices, partially processed media such as previews, and fully processed media such as personalized media that will be shared. In one embodiment, the storage 37 also stores instructions for causing the transformer module 25 and its elements to perform the functionality described herein with respect to the transformer module 25 and the server 20

The processor 36 is configured to process received media according to the information in a video tag as well as other input received at the transformer module 25 from a user device 10. For example, the processor 36 takes one or more media files, e.g., videos, and other user input, e.g., selection of a Video Tag, received by the transformer module 25 and uses them to create personalized media e.g., video file, based in part on the instructions in the selected Video Tag.

The network interface 38 transmits and receives information over a network such as the network 30. For example, the network interface 38 receives unedited media from the user device 10 and transmits personalized media to video sharing sites 80.

As described in more detail below, in one embodiment, a transformer module 25 implemented in a server 20 is used to apply a Video Tag to media to generate personalized output. The transformer module 25 manages a database of users 40 and Video Tags 42 and 62. A remote application module 15 communicates with the transformer module 25 via a network 30 to process a video clip. The remote application module 15 sends the transformer module 25 the video clip (or other media), with instructions for processing (Video Tag choice), and desired destination.

For the purpose of explanation, one embodiment of the communication between the application module and transformer module 25 will now be described. In this example, the application module 15 communicates with the transformer module 25 via https or any appropriate protocol over the network 30. This communication link can be a wireless or wired connection or both. The Application module 15 logs into user account module 40 to access the user's private set of Video Tags 42 and account information 44. The Application module 15 downloads Video Tag choices from transformer module 25 from the user account module 40, e.g., the video tags 25, or the public Video Tag list (e.g., Video Tags 62) provided by preset storage 60, or both.

Next, via the Application module 15, the user chooses a media, a Video Tag, and selects some options, including typing in a name for the clip. Application module 15 uploads the media (video clip, bitmaps, sounds, etc.) and user choices to the transformer module. Processor 36 uses the selected Video Tag and user selected options to control the creation of a finished video. In one embodiment, a single video is used to create the finished video. In some embodiments, two or more videos can be used in creating the finished video. In one embodiment, creating the finished video comprises applying one or more effects to the video. In general, an effect, or filter, may be an operation that is applied to the frames in a video in order to impart a particular look or feel. For example, a stabilization or smoothing effect may be applied to the frames in the video. In one embodiment, effects may be distinguished from transitions that are designed to alter the way in which a video begins or ends or the way in which one video moves into another video. A sample of effects may be viewed at http://www.newbluefx.com/.

Continuing on, transformer module 25 posts the finished video to user selected video sharing and social networking sites 80. As described above, the video sharing and social networking sites can have different formats and require different information when receiving uploaded videos. The transformer module 25 can use information in the user account 40, e.g., rules for propagating the finished videos, when posting the finished video. In another embodiment, the transformer module 25 can store information about the requirements and interface for uploading video to different sites or services. Additionally, the video can be sent by email, etc., to others. In other embodiments, the user application can collect rules for sharing the along with the selection of a video tag and transmit the rules along with the video tag selection.

Production Files

A Production file is an XML file, or other format file, that carries information used by the processor 36 to assemble a video project. In one embodiment, the Production is an intermediate file representing a Video Tag with all of the Options and Variables replaced. Options and Variables are described in greater detail below. The Production can be generated by a parser operating on a Video Tag. In one embodiment, the Production can be generated after a first pass of a parser through a Video Tag. In general, a Production file is a specific plan for creating a video that comprises instructions for the processor on how to assemble the video.

In one embodiment, a Production includes one ore more video and audio tracks. Within each track, in time order, are segments, which in include an input source, a trim in point, a start time relative to the end of the previous segment, a duration, one or more Plugin effects, and one or more transitions. The input source can be a media file reference such as a sound effect, a video clip, a photo, or other reference. The input source can also be a software media generator such as Titler, Background surface, or other generator. The duration can identify a specific length or be set by the length of the media. Plugin effects are referenced by name and including settings. Transitions are referenced by name and include transitions for into the segment with settings and transitions out to the next segment plus settings.

Video Tag

In one embodiment, the Video Tags or Video Tag templates 42 and 62 are XML (or other format) files that are similar to Production files. However, in Video Tags one or more of the strings within it have been replaced by unique tokens. These tokens are placeholders for option strings. Video tags also include one or more Option Sets. In one embodiment, an Option Set includes a category name, e.g., "Title Style", and a series of Option presets. In one embodiment, the option presents include a set of tokens that match tokens in the production and, for each token, the string (or data) to replace it with. In some embodiments, this string can be a simple preset name or a block of XML or other information. For example, the replacement text can be just a simple string. In another embodiment a complex block of text can be used. In some embodiments, an XML attribute can be used. An attribute can be just one parameter. An attribute can also be a set of parameters. For explanation, as described below, an effect may be applied to a Segment. A string representing the effect can comprise a block of text that includes nested attributes for each parameter. Video Tags also include external variable definitions. External variable definitions include a token identifier (ID) and a name, e.g., "Title."

Figure 3:
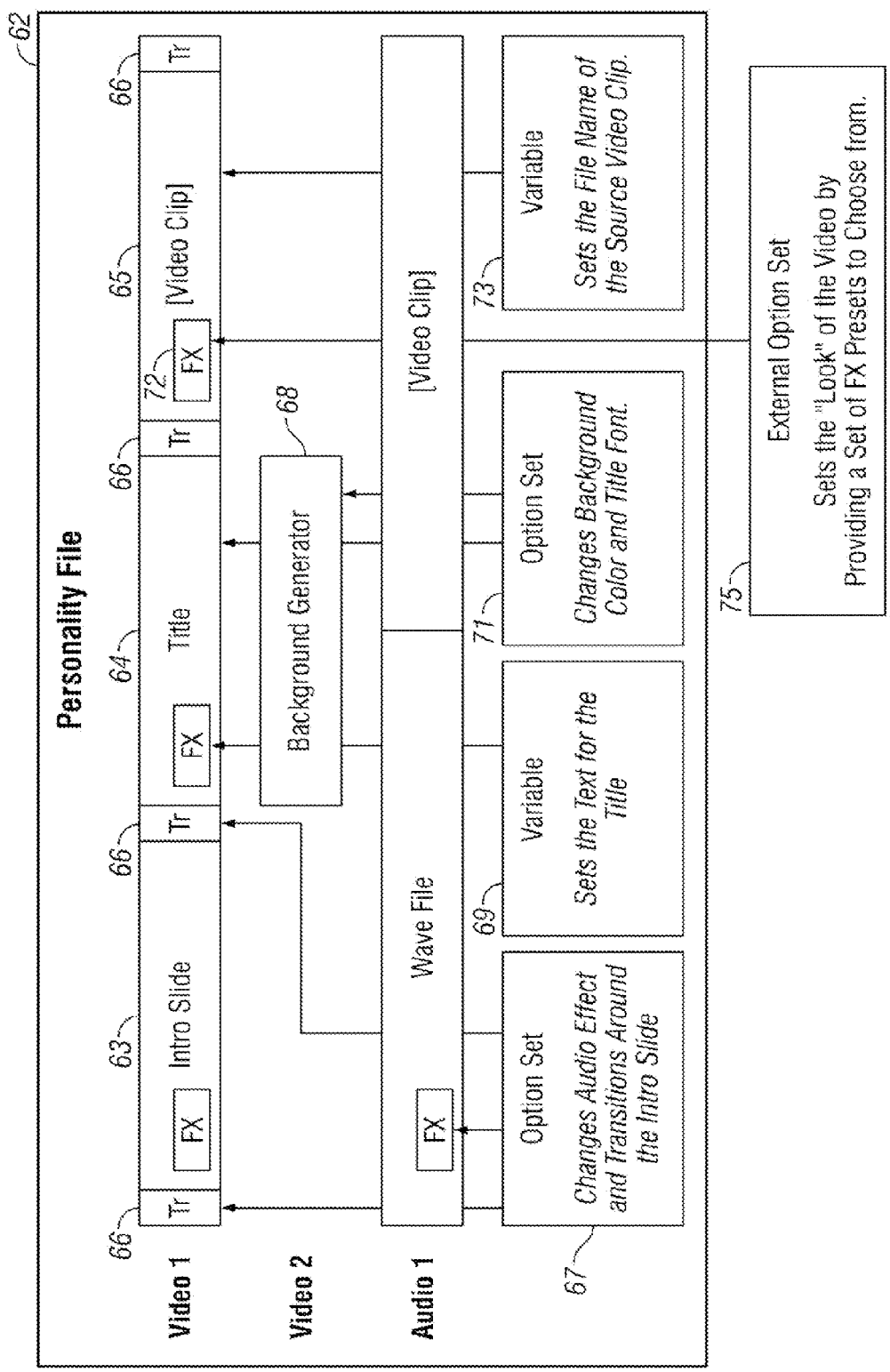
FIG. 3 is a block diagram of a media clip file format according to an embodiment.

FIG. 3 shows an exemplary Video Tag template 62. In this exemplary Video Tag template 62, there are two video tracks (Video 1 and Video 2) and one audio track (Audio 1). The top video track has Intro Slide 63, Title 64, and Video Clip Segments 65.

The Intro Slide segment 63 media is a bitmap picture with some effects applied to it. It is preceded and followed by Transition sections 66. One of the Option Sets 67 contains information for used by the processor 36 to control the transitions in and out of the segment. This means that choosing different Options chooses different preset transition choices.

The title segment 64 is generated by a Titling plugin. Underlying the title segment 64 is a second track 68 which generates the background. A Variable 69 contains the information for the actual name in the Title segment 64. This configuration allows the application module 15 to set the title with a text string. Additionally, an external Option Set 71 contains information used by the processor 36 to set some effects on the clip to achieve a particular look. This is an external set because this can be used to manipulate the look in different Video Tags. Because it is external, it looks to the Video Tag itself as if it is just another external Variable.

The Video Clip segment is a video file. This is the File that the whole Video Tag was designed to turn into a work of art. For example effects (e.g., FX 72) can be applied by the processor 36 to the contents of a video clip, such that the video clip is modified by the effects. Since the actual file choice is determined by the user, the Variable 73 provides a mechanism to set the name of the file externally. In one example, the transformer module 25 uses Video Tag 62 of FIG. 3, one or more media clips, and optionally some commands from a user and generates a finished video.

For example, a particular production may comprise multiple videos and other media that are overlaid or mixed and displayed or rendered at the same time. These can be blended through the process of "compositing". The processing engine can be a powerful video compositor that blends multiple overlaying video tracks. Many of these video tracks can incorporate an alpha channel that defines transparency and opacity. Where the track is transparent, the underlying image can be seen through it. The underlying image can be another video track, or a photo, etc. The titles can work the same way, in that each title can be generated by software that creates an image that has letters with alpha transparency around them, so the letters can overly photographs, videos, etc.

In order to illustrate the functionality of the systems described herein, one of example of the operation of the networked systems 100 is described. Via the user interface on the user device, the user chooses a Video Tag from a set of available Video Tags. As described above with respect to FIG. 2, the Video Tags can be selected from the user's private Video Tags 42 or a public Video Tag list 62. In other embodiments, the Video Tag may come from any source. For example, the Video Tag may be generated by the user, selected from pre-existing lists, or shared with other users.

The Video Tag provides Options in several categories. The user chooses an option by name or icon via the user interface. The Video Tag also includes named Variables. These represent data that is input directly into the project by the user via the user interface. Two examples are the title text and the file name of the Video Clip. In some embodiments, there are also Options that are stored in an external Options File, that are used to set one or more variables in the Video Tag. In one example, an external Options file contains an Options Set that sets the Background color and Title font. By storing the Options as a separate file, the file and its Options can be used for multiple Video Tags. In one embodiment, the external Option files are stored on the server 20. In one example, the user selects an Option via the user interface. The selected Option is mapped to the destination Video Tag as one or more Variables. In another example, a user selects External Option Set such as the External Option Set 75 of FIG. 3 via the user interface. The External Option Set sets the "Look" of the video by providing a set of FX presets to choose from.

Once input corresponding to the Video Tag, Options, and Variables has been collected by the application module, the input is transmitted to the transformer module 25 of the server 20. The processor 36 of the transformer module then parses the input. Parsing creates a Project file dynamically by substituting Options and Variables for all tokens. In one embodiment, the parsing is done as a search and replace operation by the processor. For example, for each token in the Video Tag, the equivalent token in a Variable or Option is located and the string or data for the token is substituted with the Variable or Option information.

In one embodiment, the processor applies Variables after Options. This allows a Variable to be embedded with an Option. For example, this allows a set of choices for a media file (the Options) including one option to provide your own media file, which in turn is managed with a Variable. As described above, in one embodiment, a variable is user defined. Variables can be combined with options. For example, instead of choosing a predetermined string, a user can also provide one. In another example, instead of selecting one of a plurality of media choices, e.g., bitmaps or sound files, the user may have the choice to provide the file as well. Similarly, a choice of a combination of Title font and overlaid effect is an option. A choice to set the bitmap for the title from a preset list is an Option while entering a new file is a Variable. Setting the video clip to be processed is a Variable.

After parsing the user input and creating the project file, the Processor 36 can create the personalized media. In one example, the Processor 36 takes the Project file and converts it into a time stamped sequential list of media Segments. In some embodiments, the parsing is concurrently with the processing described here. Thus, the step of creating the Project file at the processor 36 is optional in some embodiments.

Each Segment represents a portion of media to use. The segments include one or more of a track, a start time, a duration, a starting offset, a source indication (e.g., a file or Generator plugin with parameters), a transition in (including duration, an indication of the transition plugin to use, and a parameter preset to use), a transition out (including duration, an indication of the transition plugin to use, a parameter preset to use, and a destination), and one or more effects (including an effect plugin to use and a parameter preset to use).

In one embodiment, in the case of a video file, the Processor 36 creates one frame of the resulting personalized media at a time. While one embodiment of this process is described, it will be appreciated that other processes may be used to achieve similar outputs. For each frame or time stamp of the personalized media, the processor 36 performs the following steps.

First, the processor identifies each segment that is active at the particular time stamp or frame. Second, the active segments are sorted by track such that highest numbered track is handled first. This sets the order for compositing. Third, the processor initializes a blank master frame buffer and a blank master audio buffer. Fourth, for each active video segment, the processor obtains the media for the frame, e.g., video, audio, or image uploaded from the application module, and places the media in a frame buffer. The processor then applies one or more effects from the effect list to the media, applies any transition in or out that overlaps with the frame, and Alpha blends the buffer onto the master frame buffer. Fifth, for each active audio segment, the processor obtains the media for the frame and places the media in an audio buffer. The processor then applies one or more effects from the effect list to the media, applies any transition in or out that overlaps with the frame, and adds the audio to the master audio buffer. Sixth, the processor writes the master video and audio frames to an output file stream.

Various optimizations of this process are possible. For example, where the frames are processed in order, it is beneficial to the current effects and inputs as the processor may reuse all or part of the effects for proximate frames. In order to implement some effects, the processor may need time access to the source media. For example, in some embodiments, stabilization requires that the processor have access to a range of source frames in order to calculate motion vectors. To support this, in one embodiment, the transformer module stores the input stream in storage, such as a FIFO buffer, which provides random access to any individual frames within the FIFO. Thus, the processor can access frames directly from the FIFO for any effect which needs this access.

In one embodiment, as the file is written out to the destination file, it immediately is queued for transfer to the destination location. Because the file is sequentially written, this file transfer can start immediately before the entire file has been processed.

As described above, processing video effects on many devices can be prohibitively expensive in terms of time and resource consumption. For example excessive CPU usage results in high power consumption, running down the battery. Also, time delay waiting for results keeps the device unavailable for other use. In addition, even without constrained computational resources, configuration of video processing can be problematic. There are complicated steps setting up effects processing. Further, it can be very slow to develop processing tools that work on a diverse range of devices. For example, complex video effects applications that run native on the device require rewrites for every implementation. Further, implementing new effects and effect presets to be performed on user devices would require updating and downloading significant amounts of data. Also, allowing native code to run inside browser as a plugin or executable file (e.g., exe) on the device presents risky choice to user. For these reasons and the reasons described above, it is desirable to have a tool or system that allows a user to choose a video, choose and preview options, and send it off to be processed remotely and delivered quickly and easily. Additionally, it is desirable to have the impact on phone usability minimized. Certain embodiments relate to methods and systems for media processing selection and preview.

As discussed herein, embodiments of the invention make it easy with a video enabled device to quickly choose a video and arrange to have it processed, personalized, and uploaded to video sites with a few quick steps. For example, a user can shoot a video clip, assign the clip a name, quickly choose processing and personalization options, and send the clip off to be processed remotely. Advantageously, embodiments disclosed herein facilitate cost effective development of a tool that works to facilitate media personalization on a wide range of devices. Further, the tool has a low impact on the performance of the user device while providing a hassle free experience for the user. In addition, modifications adding new effects can be implemented on the server making the update process transparent and simple for users.

For purposes of explanation, the functionality of the application module 15 and its interface with a user and with the server 20 will be described in greater detail below. As described above, the Application module 15 can run on a wide range of devices (e.g., a mobile phone or web browser application). In one embodiment, in order to facilitate media personalization the Application module 15 first presents the user with a set of available videos to choose from. Next, the application module 15 allows the user to select one or more options for editing the video. These options can include trim information, e.g., start and end points within a video. The options can also include a video tag. For example, the video tag may include a logo and the application module may allow the user to modify logo parameters such as the image used for the logo, the type style of the logo, transitions into and out of the logo clip, as well as the title style and animation. The options selected by the user via the application module 15 can also include one or more effects to apply to the media. After the user makes the selections, the application module sends the video and selections to the transformer module 25 over the network 30 to create the personalized video.

In order to make the process visually stimulating and easy to use, in one embodiment, the application module 15 visual feedback via the user interface of the user device during the process of collecting user input and, in some embodiments, as the video is being processed. The Application module receives sets of options that can be selected by the user as well as previews or examples of how the various options look and sound when implemented with the uploaded media.

Figure 4:
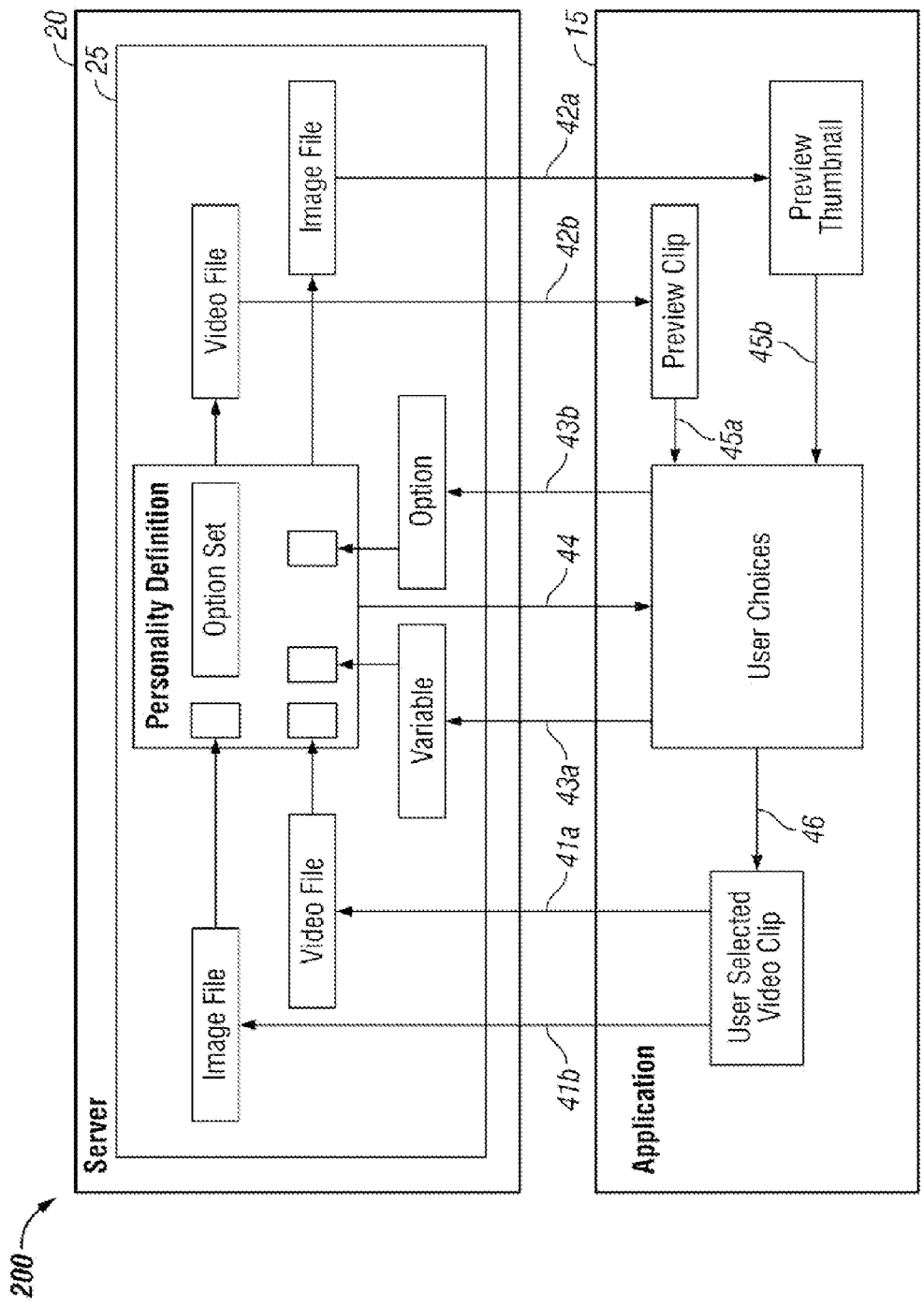
FIG. 4 is a functional block diagram and flow diagram for networked computer systems for personalizing and sharing media according to another embodiment.

FIG. 4 shows a block diagram of components and an exemplary flow of information in a system 200 in accordance with an embodiment of the present invention. It should be appreciated that FIG. 2 represents a high-level block diagram of the components used and the flow of information between the components. Such flow of information is presented here. For example, the application module 15 and server 20 may communicate as shown.

In one example, the application module 15 uploads 41 media clips to the server 20. For example, as shown, the application module 15 uploads 41a a video clip to server 20 and uploads 41b a thumbnail image of the video clip to server 20. In one embodiment, the user may initiate the upload process. However, in some embodiments, the application may extract the thumbnail without user direction and may schedule the uploading of video and thumbnails without further user input.

The application module 15 sets variables 43a and options for the Video Tag 43b based on user input. As described above, the Video Tag can be thought of as a template. The Video Tag has information Variables and Option choices that can be selected by a user. As described herein, the Video Tag may be processed and turned into a Production, which is a definition of how to assemble a final video clip.

The application module 15 requests a preview thumbnail and/or video clip. The server 20 creates preview thumbnails and/or video previews which it streams 42a and b back to the application module 15. In general, a thumbnail may be a low resolution version of a still frame or video clip. The requested thumbnail allows the user to what the processing will look like with the added effect without the CPU and time overhead of processing in full resolution. In one embodiment a single frame is used as a thumbnail to show what a particular "look" will look like. In other cases, a thumbnail comprises a video clip to illustrate the look over time, e.g., to preview a transition choice.

In one embodiment, server 20 also downloads new option choices, an option set, related to the new preview media and provides the new option choices 44 to the application module 15. The option sets can be provided as separate files or embedded in Video Tag files.

The application module 15 integrates options and preview media into the user interface ("UI") and displays 45a,b the previews and choices to the user. The user makes a choice 46 via the user interface of the application. The application module 15 sends the choice to the server 20 (e.g., sets variables and options for the Video Tag and requests new previews). This cycle of previews and additional inputs can continue until the user is happy with the final personalized media product.

In one implementation, the server includes a transformer module. This transformer module takes a Video Tag file and feeds media and parameters into it, to then generate output either in the form of image thumbnails or preview video clips. It should be appreciated that the present system and method are not limited to Video and photos for input or output. Other media types, such as sound files apply equally well.

FIGS. 5A-F represent the graphical user interface of the application module 15 operating on a mobile phone having a touch screen interface. It should be appreciated that other devices (e.g., smartphone, PDA, etc.) may alternatively be used. Additionally, it should be appreciated that the application module 15 may be used in accordance with other implementations, for example a browser application written in Flash.

Figure 5B:
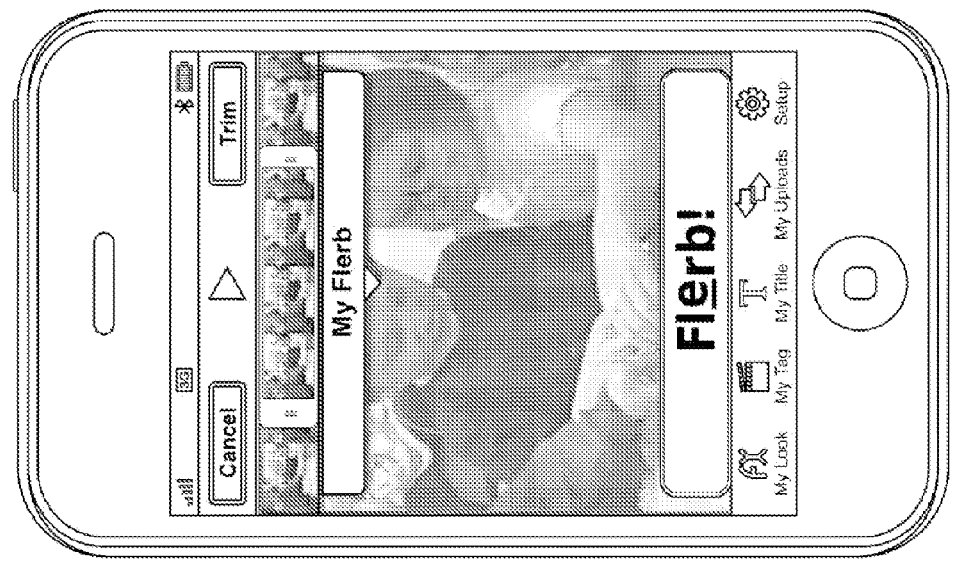
FIGS. 5A-F are illustrations of a user interface for personalizing and sharing media according to an embodiment.
Figure 5A:
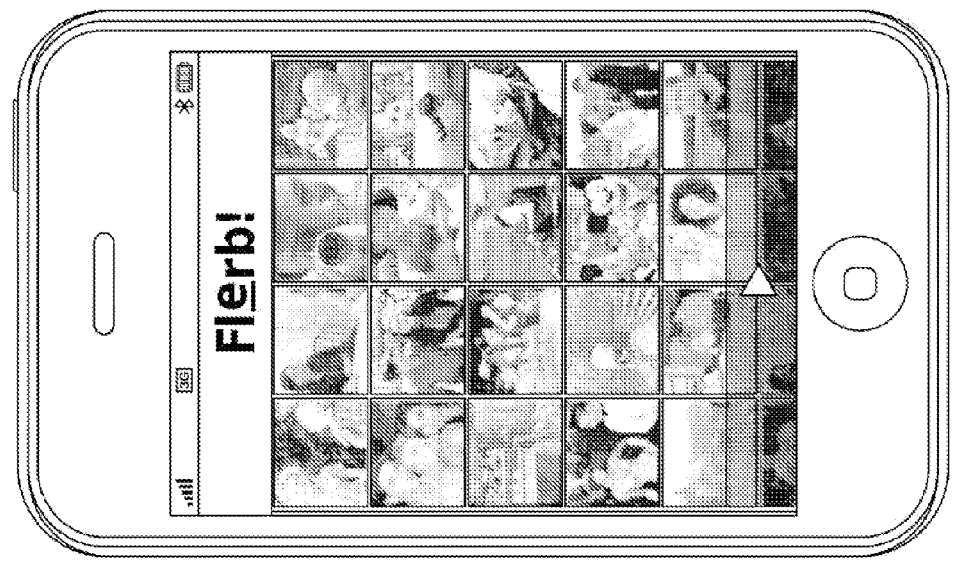

FIG. 5A illustrates a user interface for choosing a video to process and starting preparation for processing. As shown, in one embodiment, application module 15 displays thumbnails of all available videos. Typically, there is an application programming interface ("API") to handle this, even if it is the file browser. The user selects a clip. Application module 15 starts uploading the clip to the server in the background. If the user switches video choices, application module 15 cancels first stream and replaces with second stream.

FIG. 5B illustrates a user interface for setting the trim in a video, e.g., start and end points in the video clip being uploaded. In one embodiment, the application module creates a widget to select start and end points in the clip. In general, the widget may be implemented according to a number of UI API's. In general, a visual control may be supplied in order to allow a user to select start and end points for a clip. In one embodiment, to facilitate selecting trim points, the application module uses an API to extract and display thumbnails. The application overlays trim knobs that can be manipulated by the user to set in and out points. The application calls a playback API to preview between in and out points. Once selected, the application module 15 stores the values and uploads them to server.

Figure 5D:
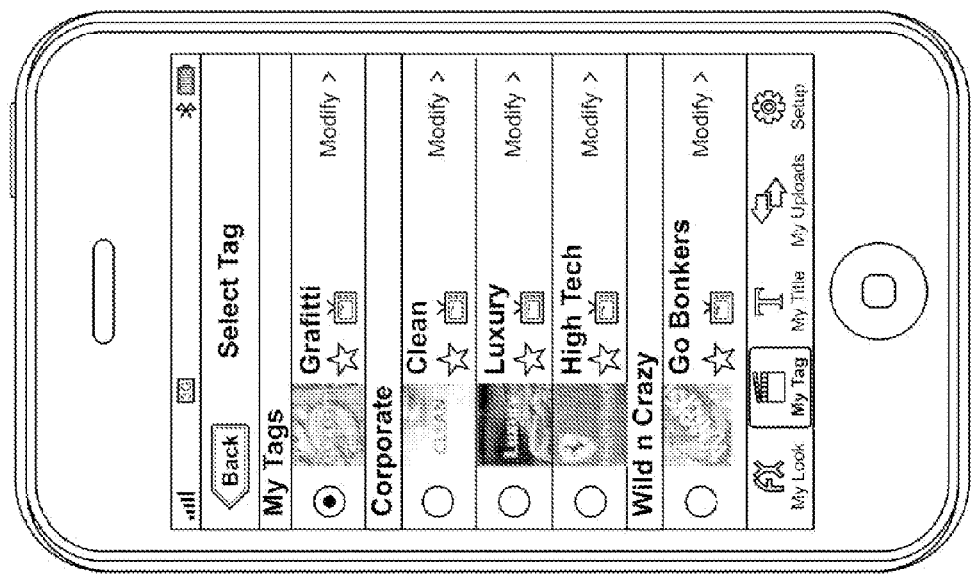
Figure 5C:
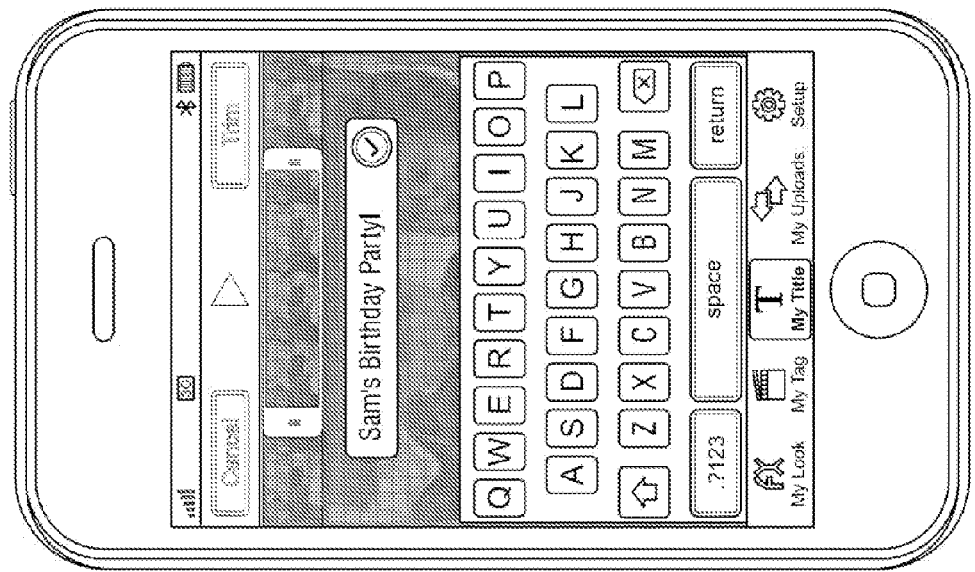

FIG. 5C illustrates a user interface for giving a text title to the clip. This function of the application also allows the user to set the name of the video for the title sequence. In one embodiment, Application module 15 presents a text entry widget, using a preferred mechanism of the device. Application module 15 stores the title text and upload to server.

FIG. 5D illustrates a user interface for selection of a video tag for the clip. In one embodiment, Application module 15 presents the user with a palette of visual icons, representing the looks of the different Video Tags and the user chooses one. In one embodiment, the server 20 streams down to the device 10 a palette of thumbnails, along with meta information such as the name of the associated Video Tag. In some embodiments, this palette could is downloaded or updated in the background when the application module starts running or periodically while running. The user chooses a Video Tag. Application module 15 stores the choice. Application module 15 sends choice to the server 20.

Figure 5F:
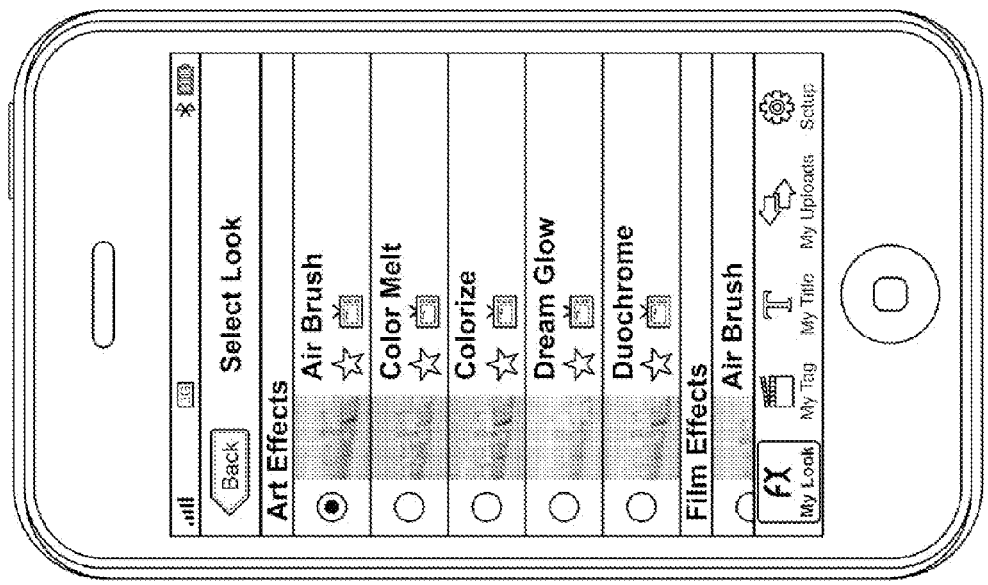
Figure 5E:
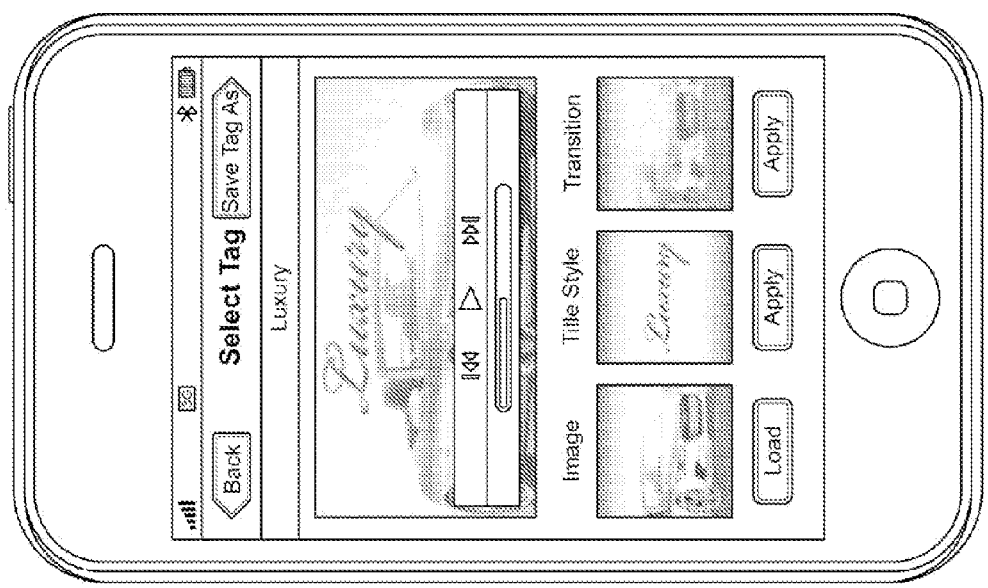

FIG. 5E illustrates a user interface for modifying a Video Tag. In one embodiment, the application module allows the user to modify one or more parameters of the Video Tag, for example Title style. In one implementation, this option data comes from the Options portion of the Video Tag definition. In one embodiment, application module 15 requests Options table (or similar list of choices) for each editable parameter from the server. Server 20 returns a list of choices to the application. In one implementation, the server 20 extracts the Options table from the Video Tag file. Application module 15 presents the choices to the user. The user makes a choice. Application module 15 sends the selection data back to the server 20. In one implementation, this data takes the form of a token and string assigned to it.

In one embodiment, after receiving the selection data, the server 20 immediately starts creating a preview clip. Generally, this is a small format preview file that can be generated and streamed in real time. While still processing, the Server 20 starts begins a download process to transfer the preview to the application module 15 for immediate viewing.

The application module saves the modified Video Tag design. In one embodiment, the user can assign the Video Tag a new name. The application module 15 uploads the final changes to the Video Tag, along with the new name and any attached media, e.g., sound effects or photos. Server 20 merges the uploaded changes into the original Video Tag definition and adds it to the user's database so that the user can reuse the video tag later.

FIG. 5F illustrates a user interface for selecting a Look for personalized media. Each Look is a combination of one or more effects to be applied to the video. In one embodiment, as described, when a video is first selected, the Application module 15 sends a thumbnail to server. Server 20 maintains a list of available looks, their names, and the effect configurations to implement them. In one implementation, this is an Option table and a Video Tag template that takes a thumbnail image and Loop option as inputs. For each look, server 20 renders the thumbnail to generate a preview thumbnail. Server 20 downloads to application module 15 the set of preview thumbnails. Server 20 downloads to application module 15 the set of names for the looks.

In one embodiment, Application module 15 creates a menu with the preview set of thumbnails. The User chooses a look from the menu. Application module 15 stores choice and uploads to the server. It is also possible to modify a look. For example, a user can change the parameters of the effect applied to the video to create a particular look.

Each effect can have a set of named preset configurations. In general a preset configuration is a particular configuration for an effect's parameters. In one embodiment, each effect has a set of parameters that can be manipulated to change the behavior of the effect. For example, an effect that creates a glow might have a parameter to control the brightness of the glow and another parameter to control the color. In some embodiments, there are between 4 and 10 parameters per effect. Each effect may be provided a set of these presets, each with a name.

In one embodiment, to facilitate modifying the looks, Application module 15 requests preset thumbnails from server 20 for the look. Server 20 runs preset effect over the thumbnails and downloads to the application module 15. The User chooses a preset and modifications. Application module 15 stores choice and uploads to the server 20. The User can also assign a modified Look a new name via the application 15. Application module 15 uploads the final changes to the Look, along with the name. Server 20 merges the uploaded changes into the original Look definition and adds it to the user's database.

After all modifications and user input, the user can indicate a final acceptance of the editing options via the application 15. This acceptance is stored by the application and transmitted to the server 20, telling it to process the video. Once the acceptance is indicated, if the video has not been uploaded yet, the application also starts sending the video stream to the server 20. In addition, if not previously sent, the application uploads the file name and destination, trim points, video tag selection (this may be encapsulated in a MyVideo Tag chunk, e.g., text in XML that chooses a particular Video Tag with Options and Variables), look selection (may be encapsulated in a MyLook chunk), and information on where to publish the final product (may be encapsulated in a MyUploads chunk).

In some cases, it is desirable to start processing the video stream shortly after the Application module 15 starts transmitting the video to the Server 20. This enables immediate creation of preview clips or final renderings even if the file is not completely uploaded. However, in some embodiments, the server 20 cannot process the stream unless it has the necessary header information. In certain files, such as some MP4 files, this header information may be placed in a location other than the head of the file (e.g., even at the tail).

Figure 6:
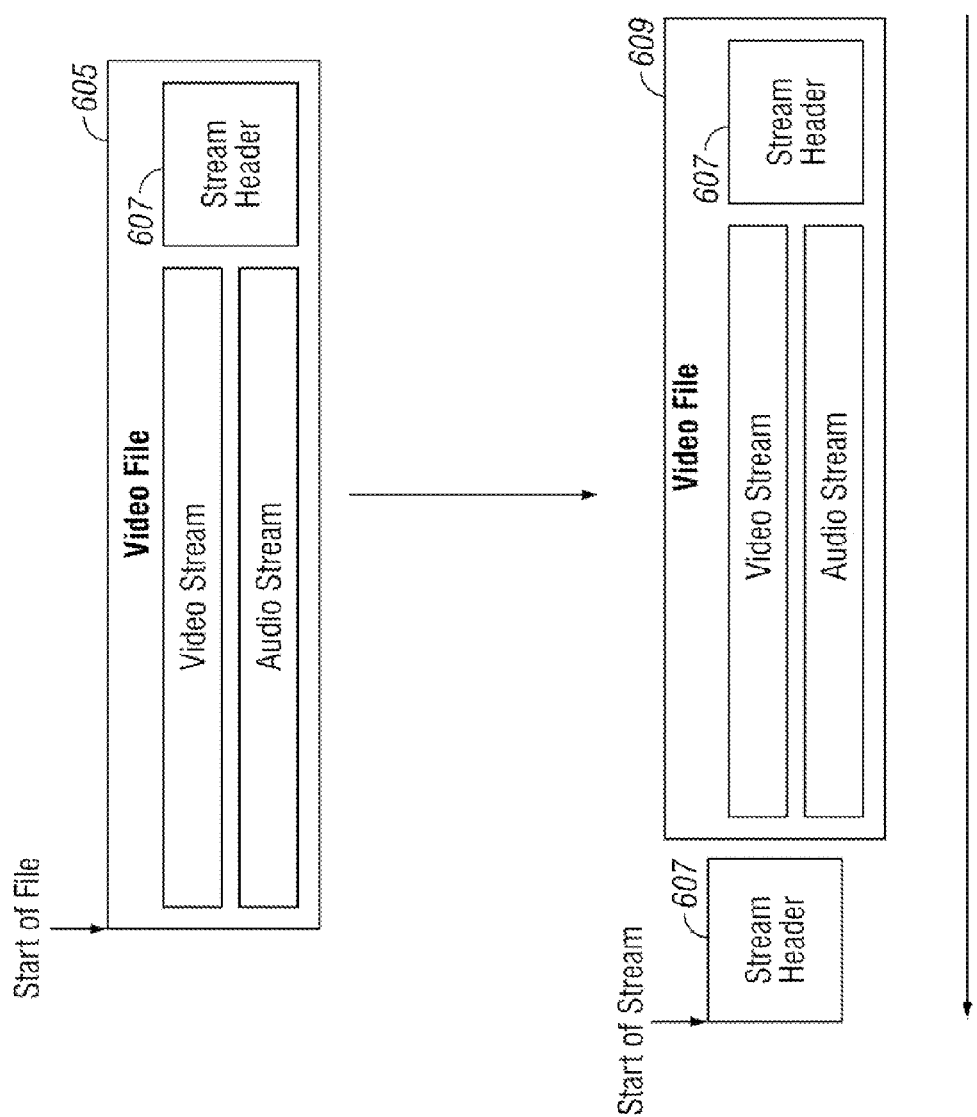
FIG. 6 is a block diagram of a media clip format according to an embodiment.

FIG. 6 is a block diagram of a media clip format and file stream. As shown, video file 605 includes a stream header or header chunk 607 located at the end of the file. In order to facilitate quicker preview playback, in some embodiments, the application module is configured to extract the header chunk 607 from the video file and to send the header chunk 607 to the server at the beginning of the file stream 609. As shown in FIG. 6, in some implementations, prior to streaming the file, the application module 15 parses the file and seeks to the header chunk.

Other embodiments of the systems and methods described above provide enhancements for the process of previewing video at the user device. In some embodiments, a motion stabilization effect is performed effectively with two passes. In one example, the first pass of the two is to perform motion analysis. This first pass can be far more CPU intensive because, in some embodiments, the processor 36 analyzes adjacent frames to calculate motion vectors (translation, scale, and rotation) between the frames. The second pass is a playback/render pass where the processor 36 uses this information from the first pass to shift the images so the video is smooth. In one embodiment, rather than perform both passes multiple times, the processor is configured to perform the motion analysis once soon after the video is uploaded. The results of the motion analysis can then be used multiple times by the processor 36 for playback render passes associated with different previews and with the final video product. By doing the complex first pass once per video, computing resources at the server are conserved and latency in generating previews is reduced.

In another embodiment, the processor 36 is configured to use different resolutions for previews and final products. In particular, in one embodiment, the processor 36 is configured to generate previews that have a lower resolution that the final product. This results in better download time of the previews that can appear to be real time to a user. In addition, by generating lower resolution previews, the server 20 conserves computing resources. In one embodiment, the processor 36 is configured to receive an uploaded video clip and to generate an intermediate clip having a lower resolution based on the uploaded video. This intermediate, low resolution clip is then used by the processor 36 for generating previews. Once all modifications have been made based on the previews, the processor applies the final selections of the user to the original, full resolution video to generate the final output.

The parameters that can be manipulate for lowering the resolution of the preview can include, depending on the embodiment, frame width and height, compression bit rate, and the actual frames per second. For example, if the normal FPS is 30 and preview is generated at 15 fps, then any effects only need to be applied half as frequently, cutting processing in half In another embodiment, it is desirable to begin generating previews before the entire video clip has been uploaded. To accomplish this, the processor is configured to start a transcode process as soon as the file starts uploading from the user device 10 to the server 20. In one embodiment, this transcode operation is requested by the application 15. Along with the request, the application provides the server with information regarding the format for the transcode or other information.

In some embodiments, these optimizations can be combined. For example, in one embodiment, the processor 36 configured to initiate a transcode as soon as a video clip begins uploading from a user device. In some embodiments, this transcode is one to many in that it renders out multiple streams simultaneously, each stream having a different file format with different data. For example, one output can be for motion analysis while another output can be used for low resolution preview generation. In one embodiment, this transcode process runs synchronously with the uploaded video, so as soon as a new block comes in, the output streams of data are prepared. In this embodiment, the streams can all be read before the file is closed. This makes it possible for the processor to provide the user device with a preview video render before the upload of the video is completed. In this situation, the preview render will not play all the way through the end of the clip, but it can work with everything that has been uploaded and processed up to the time the preview is provided.

In another embodiment, the server 20 and transformer module 25 implement a scheduling process for processing and personalizing media. Advantageously, the scheduling process ensures that the user experience is optimal, even when there is heavy loading on the server. Where multiple servers implement the functionality described with respect to the server 20, this is also allows optimization of server resource allocation so that excess resources aren't wasted and so that the servers can respond to spikes in activity without significant delay involved in waiting for new servers to spin up. In one embodiment, the transformer module implements a scheduling queue combined with priorities assignments to ensure that higher priority renders can override lower priority work.

In one embodiment, every render request from a user device is assigned a time stamp and time stamp and processing priority by the server transformer module. The transformer module places render requests in a queue. The transformer module organizes the queue first by priority and then by time stamp. Where multiple servers are used, each cloud instance allows a fixed number of processing requests simultaneously. In one embodiment, the fixed number is a function of how many cores the instance has. For example, a server with 8 core processors might support 16 concurrent processes. This ratio can be adjusted to tune for optimal performance.

In order to implement the scheduling process, the transformer module assigns different priority levels to different types of tasks. In one embodiment, communications between the user device 10 and server are given the highest priority. The next highest priority, or high, is given to creation of a video clip for immediate playback, e.g., where a user pressed the play button on the interface for the application. The next highest priority, or medium priority, is given to the initial upload transcode process that generates the intermediate files for playback and motion analysis. The lowest priority, or low priority, is given to final rendering for publication and sharing.

By assigning priorities in this manner, the transformer module ensures that the real time behavior that is necessary for a favorable user experience continues even when the servers are maxed out and waiting for new servers to come on line. During these peak periods, the final renders end up running in the background or queued for later until the log jam is over.

In another embodiment, the server 20 also performs load balancing between a plurality of servers that implement the functionality described with respect to the transformer module. The server 20 performs load balancing by assigning application module sessions to different servers. When a new application module session starts, the server 20 selects a server for the session based on one or more of CPU usage and processing queues for various servers. The selected server is assigned the session. In some embodiments, the server 20 also requests a new server instance when it sees processing activity over a threshold. In some embodiments, this threshold is based on CPU usage, processing queues, or both. However, as a new server instance can take anywhere from minutes to an hour to come online, the scheduling process described above allows the servers to ensure that high priority work continues while lower priority jobs get delayed.

Figure 7:
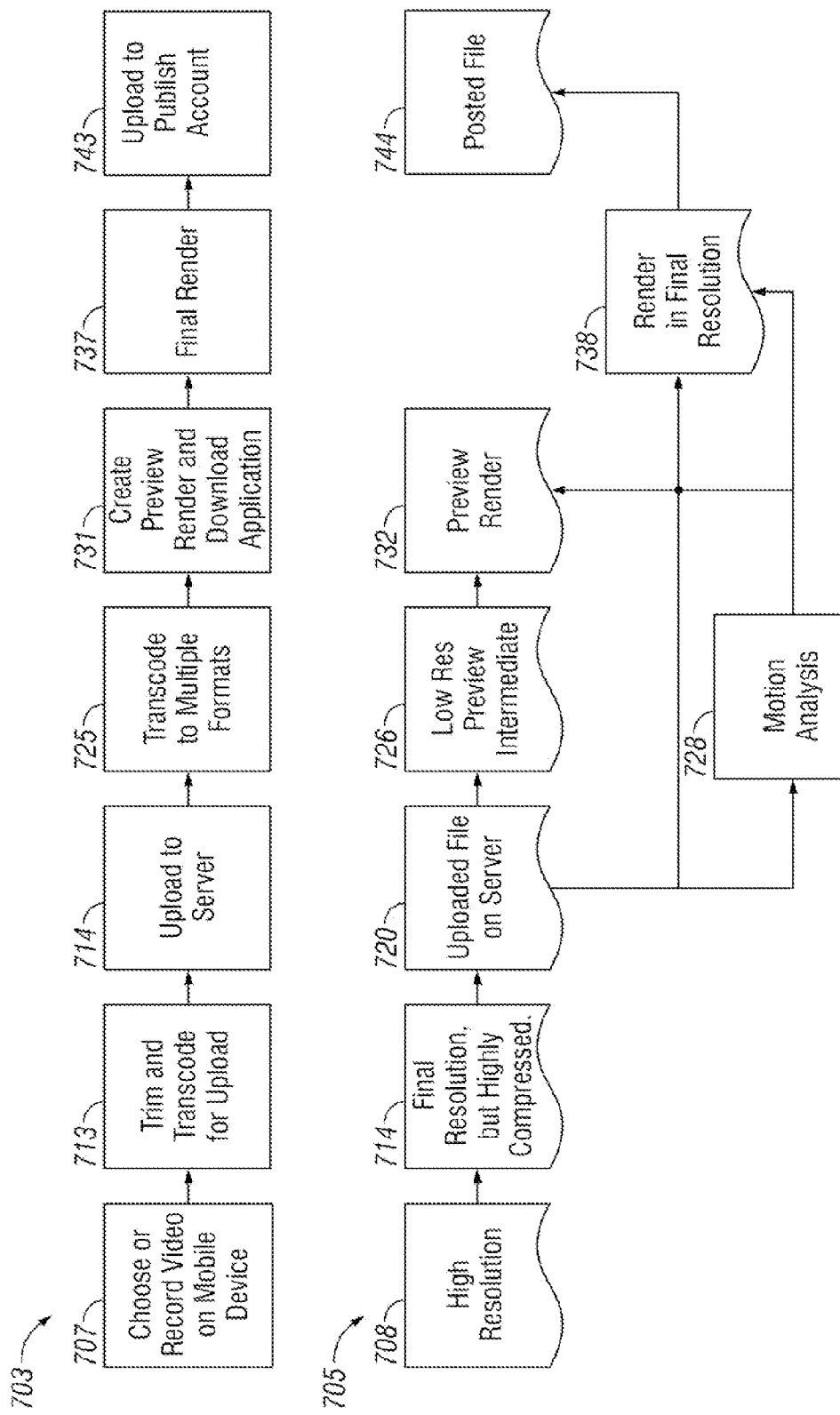
FIG. 7 is a flowchart of a method for personalizing and sharing media according to an embodiment.

FIG. 7 illustrates a flow chart 703 describing the operation of the systems 100 according to another embodiment. Flow chart 705 indicates the status of the media being processed at corresponding steps of flow chart 703. At step 707 the application module 15 presents the user with the choice of selecting a previously recorded media element to personalize or recoding a new media element. Either selection results in the identification of a media element to be processed. As shown at 708, at this point the media is at the full resolution stored on the user device.

Continuing at step 713, the application module trims and transcodes the media for upload. This is an optional step that can be performed based on the device that hosts the application module. For example, in one embodiment, if the device does not have the ability to open a trimmer natively, then the application module forces the duration of the clip to a reasonable limit. In another embodiment, the application module waits to create a trimmer at a step described below. As shown at 714, at this point the media is at its final resolution but is highly compressed.

Continuing at step 719, the application module uploads the media to the server. As discussed above, if the media format puts header information at the end, the application module transmits the last header information of the media file to the server first. The server receives the end header of the video and writes it to the end of the file, so the file is now full length, but with empty data for the entire file except for the very end. The server then reads the end block to access the format data which includes the total media length and any other necessary information. After resolving the header issue, the application module starts transmitting the video, from the start. This uploading process can continue in the background while other steps are performed. The server starts receiving the video, storing it in the file sequentially, up to the end block.

Continuing at step 725, the server transcodes the media to multiple formats. In one embodiment, the server immediately starts a transcode process while the file is still being uploaded. In one embodiment, the transcode process runs as a medium priority thread and reads the source file once but generates one or more output data files simultaneously. In one embodiment, the type of output files generated is determined based on input from the application module that requests particular kinds of files. As the source file comes in, the transformer module reads each frame at a time and passes each frame to one or more writers, each of which uses the image data to generate an output file. Output file types include an intermediary preview transcode 726, a motion analysis file 728, and thumbnail files 732.

The intermediary preview transcode is a low resolution/low frame rate version of the original file. This temporary file is used to create previews quickly. It is optimized to be streamed from the server from hard disk with low CPU usage. In one embodiment, the output transcode is implemented by the transformer module as a video file writer that converts the image to a lower resolution and writes it to the output stream. This video format can be exactly the frame rate and resolution of the previews that it will be used to generate. However, it can be low compression since it is on a local drive so bandwidth is not an issue.

The motion analysis file stores the motion vectors frame by frame. To create this file, the transformer module compares successive frames, looking for motion, rotation, and scale changes. It also looks for rolling shutter distortion. The output file is simply a set of motion vectors, one for each frame.

Thumbnail files are a series of jpeg, or other format, files that are written out at intervals determined by the application module. These thumbnails can then be streamed back down to the application module to be used in a trimmer. Note that this primarily used for devices that require the thumbnails, such as devices that use Flash. iPhone, for example, may not use these thumbnails. In one embodiment, if the application omitted a trimmer previously, it starts reading the thumbnail files as they become available and displays them for use in selecting trim points.

Continuing at step 731, the server creates preview renders and downloads the previews to the application module. After beginning to upload the media the application module is immediately able to start using the transcoded files to perform different operations in real time. Each of these files can be read from start to current upload point, so the application doesn't need to wait for a full upload before the user can start making choices and previewing them. For example, the application can begin to use the downloaded previews to implement a trimmer. In one embodiment, the trimmer provided by the application module downloads thumbnails dynamically and draws them in a strip. Although the thumbnails progressively fill over time, the operation of setting the points can still proceed. This just sets start and end points which will be used in the final render. The application module can also use the preview to implement an effects preview. The server uses the transcoded file to generate a preview to view the effect in real time as applied to the clip. The clip is downloaded to the application and shown to the user. Similarly, the server can generate video tag previews that take the user's choices for photo, text, and style. The preview can be downloaded and shown to the user via the application module. This generates a preview to view what it might look like. The server can also generate a final project preview. This is used to let the user see what the entire clip looks like, but in lower resolution.

In more detail, an effects preview can be generated by the server. The server uses the transcoded file to generate a preview to view the effect in real time as applied to the clip. In particular, a user clicks on the play button on the user interface of the application module. The application sends the instruction to the server to create a new render using the preview transcode as input with the selected effect applied. In one embodiment, the instruction is used to generate an XML Production file by the server. In some embodiments, response times for previews is important for user satisfaction, accordingly, the effects preview generation is assigned a high priority by the server. In some embodiments, because the transcoded input and the output render are both low resolution, the processing engine is able to create the file in real time. If stabilization is required, the transformer module also applies this in the render pass. The transformer module uses the analysis data from the first pass to calculate how to move the image to compensate for jitter.

After this processing begins, the server starts to stream the preview to the application module immediately. Because of the low resolution of the input and output, the server is able to stream in real time. The application module starts playing the streamed media immediately. To the user, the behavior is identical to clicking on a video player showing a previously rendered video. There is some latency from each of the stages, but it can be remarkably close to the time required to start a static file playing over the internet. However, it can only play up to the current upload point, then it stops.

The server may also generate a Video Tag preview. In this preview, the server takes the user's choices for photo, text, and style and generates a preview to view what it might look like. As discussed above, the User enters a name for the Tag using the application. The application uploads the text to the server. The User also chooses a picture for the media using the application. The application uploads an image, e.g., a jpeg file, to the server. The User chooses a Video Tag style to use via the application and the user clicks on the Play button on the application's user interface. The application sends the instructions to the server to create a new render using the Video Tag project file with User's Name, and Image. In some embodiments, this render also incorporates the start of the uploaded video, so the transition can be demonstrated. In some embodiments, the application requests the render in sufficiently low resolution for real time response. At the server, the render starts as a high priority process and the server immediately starts streaming to the application for playback.

The server can also generate a final project preview. In some embodiments, this occurs when a user clicks on the play button in the application user interface. In response to an indication of the selection by the user from the application, the server generates the final production file but with the preview, i.e., lower resolution. The server starts writing the file as a high priority process. Once processing begins, the server starts to stream the file back to the application. Once the application begins to receive the stream it begins playback.

Continuing at step 737, the server generates the final render. Via the application user interface, a user chooses to publish the video clip. The server responds to an indication from the application of this selection by generating the final render in high resolution that will be published to the destination (Facebook, Youtube, etc.) The final render is queued by the server as a low priority process. In addition, if there are other renders in the queue ahead of it, the final render waits. After requesting the final render, the application does not need to provide any additional input and can leave the session. Eventually, the render request makes it to the head of the queue and is assigned to a processor which starts the job as a priority process so that it will only run when higher priority requests are not actively processing. When the render is finished, the server sends to the video file to the destination (Youtube, Facebook, etc.) and then notifies the user that the video has been published.

It should be appreciated that the transformer module and/or processor module can reside on a cloud server, a local computer or other device. All peripheral devices including a monitor or display and input/output devices can be used by the user to perform such editing as needed. Additionally, in embodiments where the transformer module and/or processor module reside on a cloud server, communication links such as wireless or wired connections (e.g., a network connection) are provided so that the user can access the transformer module and/or processor module from the cloud server from his local computer or other device (e.g., via application module).

In fact, in certain embodiments, the cloud server can make decisions about what materials to make available to a user, including: Intros, e.g., the personality, or "tag" templates; effects; destinations for posting; and video clip to use in the intro or outro, so for example a partner promotion can be substituted. This information can dynamically be collected, based on different inputs. For example, in certain implementations, the user can inform the server with the GPS location. This can be done automatically. In other words, the user's device can have a GPS circuit included in it, or can get GPS assisted coordinates form the network. This information can then be sent to the cloud server and can influence what video tag selections are made available to the user. For example, the cloud server can then determine that the user is at a specific location like a theme park, convention center, movie theatre, etc., and provide, e.g., intros and titles based on where the user is located.

There can also be a mechanism on the client device for identifying special promotions with 3rd party, for example, typing in a special code, scanning a bar code or Q-code, etc. The cloud server can also check the time, location, or both and determined whether there is a promotion that is at a specified time, location, or both. Further, information in the database that was collected elsewhere can be used to determine special promotions or other information. For example, a user may have been signed up through a promotion with a partner, which can be flagged on the back end.

The cloud server can also be configured to track certain information such as which intros and effects the client uses each time the client creates a video. With this information, the cloud server can track usage statistics and correlate with other user demographics, etc. This can be used to constantly update promotions, titles, videos, and other effects. This can also be used to determine which types of effects and intros to create next, which ones to recommend, which ones to charge a premium for, etc. This information can also be used to report to promotion partners, potentially for revenue generation, e.g., invoice for the number of intros used.

Also, because the server manages what each user has available, it is easy to integrate mechanisms for monetizing via the selling of Effects, Intros, and other items. For example, many effects and intros can be offered as "free". New effects and intros can dynamically show up in the client device, labeled "premium". When the user chooses a premium effect or intro, it can be previewed, but must be purchased, e.g., through in app purchasing mechanism, in order to use. Once purchased, the database records that the user has the rights to this material. This right moves with the user to all devices in the account. The user can have the option to purchase a subscription, which enables use of all premium content. This simply sets a flag in the user account, allowing use of all materials.

Those of skill will appreciate that the various illustrative logical blocks, modules, and algorithm steps described in connection with the embodiments disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the design constraints imposed on the overall system. Skilled persons can implement the described functionality in varying ways for each particular application, but such implementation decisions should not be interpreted as causing a departure from the scope of the invention. In addition, the grouping of functions within a module, block or step is for ease of description. Specific functions or steps can be moved from one module or block without departing from the invention.

The various illustrative logical blocks and modules described in connection with the embodiments disclosed herein can be implemented or performed with a general purpose processor, a digital signal processor (DSP), application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of machine or computer readable storage medium. An exemplary storage medium can be coupled to the processor such that the processor can read information from, and write information to, the storage medium. In the alternative, the storage medium can be integral to the processor. The processor and the storage medium can reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. For example, while the present invention has been described as encompassing a method and tool or system for personalizing media, it should be understood that the tool can be implemented as electronic hardware, computer software, or combinations of both. Thus, it is to be understood that the description and drawings presented herein represent a presently preferred embodiment of the invention and are therefore representative of the subject matter which is broadly contemplated by the present invention.

In accordance with an implementation, a transformer module is implemented on a web server. The transformer module is used to apply a Video Tag to media to generate personalized output. The transformer module manages a database of users and Video Tags. A remote application module invokes the transformer module to process a video clip. The remote application module sends the transformer module the video clip (or other media), with instructions for processing (Video Tag choice), and desired destination.

What is claimed:

1. A method of personalizing media, the method comprising, by at least one server:
    maintaining one or more templates for personalizing media, wherein each of the one or more templates comprises one or more variables;
    for each of a plurality of media,
        identifying at least one of the one or more templates to be used to personalize the media,
        receiving a media file representing the media from a user device, wherein an end portion of a file representing the media at the user device is received prior to receiving any other portion of that file from the user device,
        receiving one or more values from the user device, wherein each of the one or more values corresponds to one of the one or more variables of the identified at least one template,
        reading the media file once to generate a plurality of intermediate representations of the media, wherein the plurality of intermediate representations comprise at least a preview transcode, wherein the preview transcode comprises a lower resolution version of the media, and
        generating a plurality of production files comprising one or more preview production files based, at least in part, on the preview transcode and the one or more values, and a final production file based, at least in part, on the media and the one or more values;
    assigning a priority to each of the plurality of production files for the plurality of media based on whether each production file of the plurality of production files is a preview production file or a final production file; and
    queuing each of the plurality of production files for rendering according to its assigned priority.

2. The method of claim 1, wherein the plurality of intermediate representations further comprise a motion analysis profile.

3. The method of claim 1, wherein the lower resolution version is a lower frame rate version.

4. The method of claim 1, wherein reading the media file once to generate a plurality of intermediate representations is performed concurrently with receiving the media file.

5. The method of claim 1, further comprising, by the at least one server:
    rendering a preview video based on one of the one or more preview production files; and
    transmitting the preview video to the user device.

6. The method of claim 5, wherein transmitting the preview video is performed concurrently with receiving the media file.

7. The method of claim 5, further comprising, by the at least one server, receiving feedback input responsive to transmission of the preview video, wherein generating the final production file is further based, at least in part, on the feedback input.

8. The method of claim 1, further comprising, by the at least one server, for one or more of the plurality of media:
    rendering a final media product based on the final production file; and
    transmitting the final media product to a video sharing website.

9. A system for personalizing media, the system comprising:
    at least one hardware processor;
    a network interface; and
    one or more modules configured to, when executed by the at least one hardware processor,
        maintain one or more templates for personalizing media, wherein each of the one or more templates comprises one or more variables,
        for each of a plurality of media,
            identify at least one of the one or more templates to be used to personalize the media,
            receive a media file representing the media from a user device, wherein an end portion of a file representing the media at the user device is received prior to receiving any other portion of that file from the user device,
            receive one or more values from the user device, wherein each of the one or more values corresponds to one of the one or more variables of the identified at least one template,
            read the media file once to generate a plurality of intermediate representations of the media, wherein the plurality of intermediate representations comprise at least a preview transcode, wherein the preview transcode comprises a lower resolution version of the media, and
            generate a plurality of production files comprising one or more preview production files based, at least in part, on the preview transcode and the one or more values, and a final production file based, at least in part, on the media and the one or more values;
        assign a priority to each of the plurality of production files for the plurality of media based on whether each production file of the plurality of production files is a preview production file or a final production file; and
        queuing each of the plurality of production files for rendering according to its assigned priority.

10. The system of claim 9, wherein the plurality of intermediate representations further comprise a motion analysis profile.

11. The system of claim 9, wherein the lower resolution version is a lower frame rate version.

12. The system of claim 9, wherein reading the media file once to generate the plurality of intermediate representations is performed concurrently with receiving the media file.

13. The system of claim 9, wherein the one or more modules are further configured to render a preview video based on one of the one or more preview production files, and transmit the preview video to the user device.

14. The system of claim 13, wherein transmitting the preview video is performed while the network interface receives the media file.

15. The system of claim 13, wherein the one or more modules are further configured to receive feedback input responsive to transmission of the preview video, and generate the final production file further based, at least in part, on the feedback input.

16. The system of claim 13, wherein the one or more modules are further configured to render a final media product based on the final production file, and transmit the final media product to a video sharing website.

17. The system of claim 9, wherein assigning a priority to each of a plurality of production files for the plurality of media based on whether the production file is a preview production file or a final production file comprises assigning a higher priority to a preview production file than to a final production file.

18. The method of claim 1, wherein assigning a priority to each of a plurality of production files for the plurality of media based on whether the production file is a preview production file or a final production file comprises assigning a higher priority to a preview production file than to a final production file.

19. The method of claim 1, further comprising, by the at least one server:
when the end portion is received, writing the end portion to an end of the media file while leaving a front of the media file empty; and,
subsequently, when blocks representing a front portion of the file from the user device are received, sequentially writing the blocks from the front of the media file up to the written end portion at the end of the media file.

20. The method of claim 19, wherein reading the media file once to generate a plurality of intermediate representations of the media is begun after the end portion is written to the end of the media file but before one or more of the blocks representing the front portion are written to the media file.

21. The method of claim 1, wherein the plurality of intermediate representations further comprise a thumbnail image.

22. The system of claim 9, wherein the one or more modules are further configured to:
when the end portion is received, write the end portion to an end of the media file while leaving a front of the media file empty; and,
subsequently, when blocks representing a front portion of the file from the user device are received, sequentially write the blocks from the front of the media file up to the written end portion at the end of the media file.

23. The system of claim 20, wherein reading the media file once to generate a plurality of intermediate representations of the media is begun after the end portion is written to the end of the media file but before one or more of the blocks representing the front portion are written to the media file.

24. The system of claim 9, wherein the plurality of intermediate representations further comprise a thumbnail image.

25. A system for personalizing media, the system comprising:
at least one hardware processor;
a network interface; and
one or more modules configured to, when executed by the at least one hardware processor,
maintain one or more templates for personalizing media, wherein each of the one or more templates comprises one or more variables,
for each of a plurality of media,
identify at least one of the one or more templates to be used to personalize the media,
receive the media from a user device,
receive one or more values from the user device, wherein each of the one or more values corresponds to one of the one or more variables of the identified at least one template,
read the media once to generate a plurality of intermediate representations of the media, wherein the plurality of intermediate representations comprise at least a preview transcode, wherein the preview transcode comprises a lower resolution version of the media, and
generate a plurality of production files comprising one or more preview production files based, at least in part, on the preview transcode and the one or more values, and a final production file based, at least in part, on the media and the one or more values;
assign a priority to each of the plurality of production files for the plurality of media based on whether each production file of the plurality of production files is a preview production file or a final production file, wherein a higher priority is assigned to a preview production file than to a final production file; and
queuing each of the plurality of production files for rendering according to its assigned priority.

26. A method of personalizing media, the method comprising, by at least one server:
maintaining one or more templates for personalizing media, wherein each of the one or more templates comprises one or more variables;
for each of a plurality of media,
identifying at least one of the one or more templates to be used to personalize the media,
receiving the media from a user device,
receiving one or more values from the user device, wherein each of the one or more values corresponds to one of the one or more variables of the identified at least one template,
reading the media once to generate a plurality of intermediate representations of the media, wherein the plurality of intermediate representations comprise at least a preview transcode, wherein the preview transcode comprises a lower resolution version of the media, and
generating a plurality of production files comprising one or more preview production files based, at least in part, on the preview transcode and the one or more values, and a final production file based, at least in part, on the media and the one or more values;
assigning a priority to each of the plurality of production files for the plurality of media based on whether each production file of the plurality of production files is a preview production file or a final production file, wherein a higher priority is assigned to a preview production file than to a final production file; and
queuing each of the plurality of production files for rendering according to its assigned priority.

* * * * *